United States Patent
Youel et al.

(10) Patent No.: US 9,432,517 B2
(45) Date of Patent: Aug. 30, 2016

(54) METHODS, APPARATUSES, AND SYSTEMS FOR GENERATING AN ACTION ITEM IN RESPONSE TO A DETECTED AUDIO TRIGGER DURING A CONVERSATION

(71) Applicants: Ted Youel, Edina, MN (US); John H. Yoakum, Cary, NC (US)

(72) Inventors: Ted Youel, Edina, MN (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 144 days.

(21) Appl. No.: 13/761,464

(22) Filed: Feb. 7, 2013

(65) Prior Publication Data
US 2014/0219434 A1    Aug. 7, 2014

(51) Int. Cl.
*H04M 3/00* (2006.01)
*H04M 3/56* (2006.01)

(52) U.S. Cl.
CPC ........... *H04M 3/56* (2013.01); *H04M 2201/40* (2013.01)

(58) Field of Classification Search
CPC ........... H04M 3/42221; H04M 3/533; H04M 1/656; H04M 3/56; H04M 3/568; H04M 3/563; H04M 3/567; H04W 4/16; H04W 4/06
USPC .............................. 379/67.1, 202.01; 455/416
See application file for complete search history.

(56) References Cited

U.S. PATENT DOCUMENTS

| | | | |
|---|---|---|---|
| 6,754,631 | B1 | 6/2004 | Din |
| 8,060,563 | B2 | 11/2011 | Whynot et al. |
| 2010/0011373 | A1 | 1/2010 | Youel et al. |
| 2010/0158204 | A1 | 6/2010 | Diskin et al. |
| 2012/0121076 | A1 | 5/2012 | Yoakum |
| 2012/0158849 | A1 | 6/2012 | Yoakum et al. |
| 2012/0296914 | A1* | 11/2012 | Romanov et al. ............ 707/741 |
| 2013/0066974 | A1 | 3/2013 | Yoakum et al. |
| 2013/0108029 | A1* | 5/2013 | Blewett et al. .............. 379/67.1 |

OTHER PUBLICATIONS

Tur et al., "The CALO Meeting Assistant System," IEEE Transactions on Audio, Speech, and Language Processing, vol. 18, No. 6, Aug. 2010, pp. 1601-1611.

* cited by examiner

*Primary Examiner* — Rasha Al Aubaidi
(74) *Attorney, Agent, or Firm* — Sheridan Ross P.C.

(57) ABSTRACT

Embodiments include methods, apparatuses, and systems for generating an action item in response to a detected audio trigger during a conversation. Embodiments relate to generation of one or more action items in response to detection of an audio trigger, such as a spoken command, keyword, audio tone or other indicator, which is detected during a conversation, such as an audio or video conference or peer-to-peer conversation. The audio trigger and a portion of the conversation are then used to generate an action item relating to the audio trigger and an accompanying portion of the conversation. By automatically generating action items in real time as part of a conversation, action items can be captured and stored more efficiently, and the participants in the conversation are allowed greater confidence that all items requiring follow up actions are properly stored and organized.

21 Claims, 6 Drawing Sheets

METHODS, APPARATUSES, AND SYSTEMS FOR GENERATING AN ACTION ITEM IN RESPONSE TO A DETECTED AUDIO TRIGGER DURING A CONVERSATION

BACKGROUND

1. Field of the Disclosure

The technology of the disclosure relates to generating action items based on content of a conversation, such as a meeting or conference call.

2. Technical Background

Today, a huge percentage of our work day is consumed by meetings and conversations, but there are very few controls put in place to capture and track actions agreed to in such events. Modern business meetings and conferences typically include the creation of action items, such as tasks, appointments, deliverables, or follow-up items for various participants in the meeting or other persons associated with the content of the meeting. Presently, action items are maintained manually by the individuals tasked with the action items, and the responsibility of tracking these action items to completion typically falls on the responsible individual as well. However, tracking these action items in a systematic and centralized manner can be difficult. Conference call providers generally provide features and functionality while the meeting is in progress, but often provide little follow up features or functionality after the meeting has ended. This can result in businesses taking on unnecessary expense, risk of non-completed actions, and decreased employee productivity.

In the past, many participants in a meeting had to rely on static text. For example, participants relied on static text contained in an email or other communication to assign and track an action item's progress. Attempts have previously been made to centrally store a number of action items through server-based solutions such as Wiki sites, and through software products such as Microsoft Outlook® and Avaya® Aura Conferencing©. However, these solutions generally require manual entry of individual action items, which decreases efficiency and accuracy.

None of these solutions solves the problem of capturing action items created during a meeting, conference, or other conversation. Accordingly, there exists a need for an automated system for generating and tracking action items created during a meeting.

SUMMARY OF THE DETAILED DESCRIPTION

Embodiments disclosed in the detailed description include methods, apparatuses, and systems for generating an action item in response to a detected audio trigger during a conversation. Embodiments are disclosed that relate to generation of one or more action items in response to detection of an audio trigger. The audio trigger, such as a spoken command, keyword, audio tone, or other indicator, is detected during a conversation, such as an audio or video conference or peer-to-peer conversation. The audio trigger and a portion of the conversation are then used to generate an action item relating to the audio trigger and an accompanying portion of the conversation. One or more participants in the conversation are then notified of the action item, for example by an audio, text or graphic alert, or other indicator. By automatically generating action items in real time as part of a conversation, action items can be captured and stored more efficiently, and the participants in the conversation are allowed greater confidence that all items requiring follow up actions are properly stored and organized.

In this regard in one embodiment, a method is provided. The method comprises monitoring audio content of a conversation having a plurality of participants and detecting a predefined audio trigger in the audio content. The method further comprises generating at least one action item associated with at least one of the plurality of participants in response to detecting the predefined audio trigger, wherein the at least one action item is based on the predefined audio trigger and on a portion of the audio content associated with the predefined audio trigger. The method also comprises notifying the at least one of the plurality of participants that the at least one action item has been generated.

In another embodiment, a conference bridge controller is provided. The conference bridge controller is configured to monitor audio content of a conversation having a plurality of participants and detect a predefined audio trigger in the audio content. The conference bridge controller is further configured to generate at least one action item associated with at least one of the plurality of participants in response to detecting the predefined audio trigger, wherein the at least one action item is based on the predefined audio trigger and on a portion of the audio content associated with the predefined audio trigger. The conference bridge controller is also configured to notify the at least one of the plurality of participants that the at least one action item has been generated.

In another embodiment, a non-transitory computer-readable media containing instructions for directing a processor to perform a method is provided. The method comprises monitoring audio content of a conversation having a plurality of participants and detecting a predefined audio trigger in the audio content. The method further comprises generating at least one action item associated with at least one of the plurality of participants in response to detecting the predefined audio trigger, wherein the at least one action item is based on the predefined audio trigger and on a portion of the audio content associated with the predefined audio trigger. The method also comprises notifying the at least one of the plurality of participants that the at least one action item has been generated.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
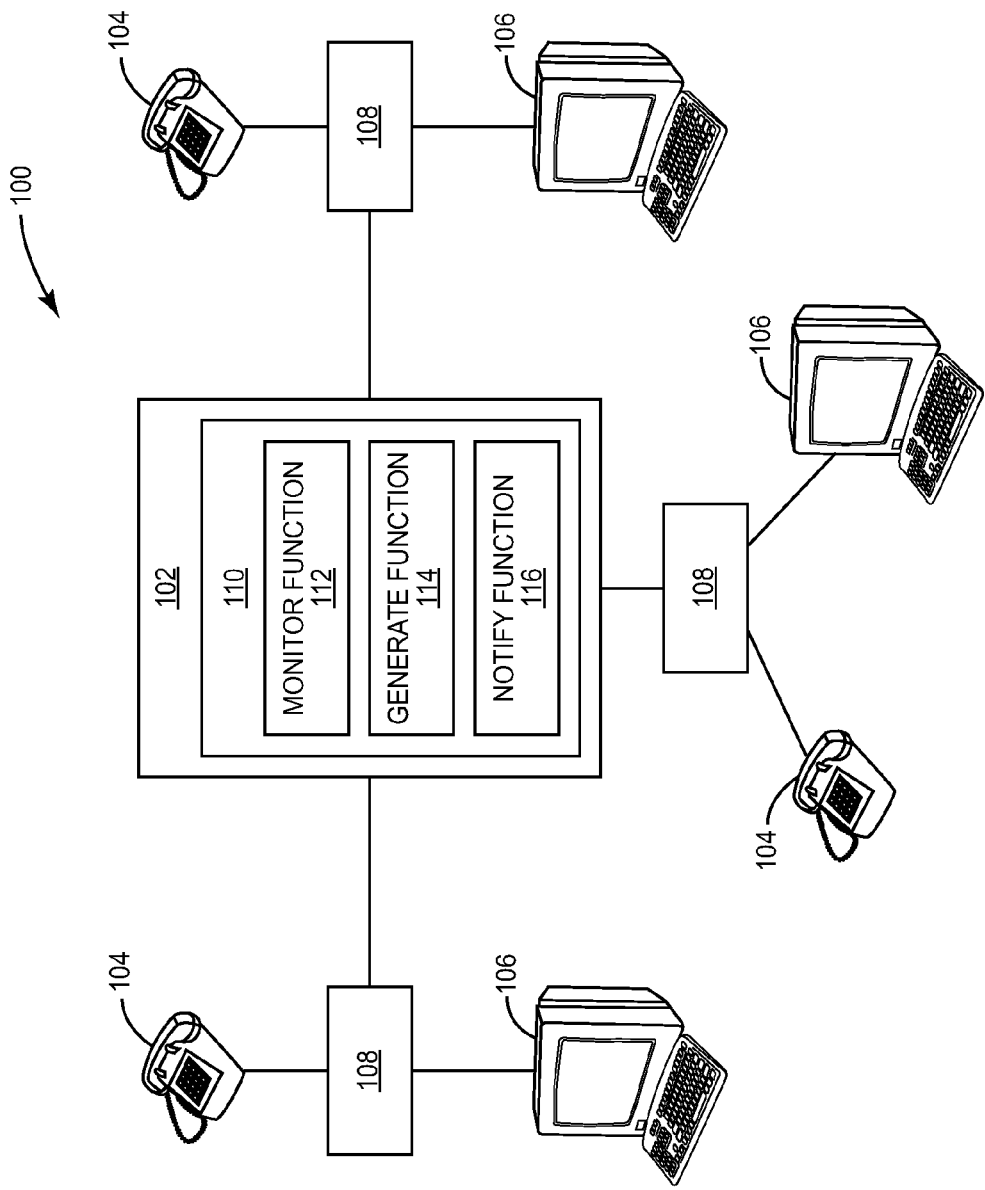
FIG. 1 is a block diagram of an exemplary conference system for generating an action item according to one embodiment.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods, apparatuses, and systems for generating an action item in response to a detected audio trigger during a conversation. Embodiments are disclosed that relate to generation of one or more action items in response to detection of an audio trigger. The audio trigger, such as a spoken command, keyword, audio tone, or other indicator, is detected during a conversation, such as an audio or video conference or peer-to-peer conversation. The audio trigger and a portion of the conversation are then used to generate an action item relating to the audio trigger and an accompanying portion of the conversation. One or more participants in the conversation are then notified of the action item, for example by an audio, text or graphic alert, or other indicator. By automatically generating action items in real time as part of a conversation, action items can be captured and stored more efficiently, and the participants in the conversation are allowed greater confidence that all items requiring follow up actions are properly stored and organized.

In this regard, FIG. 1 is a block diagram of an exemplary conference system 100 for generating an action item according to one embodiment. In this embodiment, the conference system 100 includes a conference bridge 102 connected to a plurality of IP-capable telephones 104 and computing devices 106 via one or more network interfaces 108. The conference bridge 102 includes a conference bridge controller 110 having a number of functions, including a monitor function 112, a generate function 114, and a notify function 116. In some embodiments, alternative hardware and/or software may be used to establish the conference. For example, in some embodiments, the conference bridge 102 may be replaced or augmented with a media server, Web Real Time Communications (WebRTC) constructs such as media anchors or media processing elements, and other devices and methods for managing media. Other examples of conference systems may be found in U.S. patent application Ser. No. 12/341,246 ("Method and System for Detecting a Relevant Utterance in a Voice Session") and Ser. No. 12/948,140 ("Method and System for Controlling Audio Signals in Multiple Concurrent Conference Calls"), which are hereby incorporated by reference in their entireties for this purpose.

With continuing reference to FIG. 1, the conference system 100 permits a plurality of participants to conduct a conference or other conversation via the telephones 104 and/or computing devices 106. In this embodiment, each participant participates in the conversation via a respective telephone 104 and interacts with the non-audio portion of the conversation, such as presentation slides, text messages, and other computing interface objects, via a respective computing device 106. In other embodiments, the telephone 104 and computing device 106 may be the same device. Likewise, in other embodiments, the telephone 104 and/or computing device 106 may be omitted or replaced with alternative hardware. For example, in some embodiments, the telephones 104 and/or computing devices 108 may be combined with each other, and may also be combined, augmented, or replaced with other capable devices, software or systems. Examples of such devices, software or systems include, soft clients, browsers, apps, WebRTC capable software, et al.

The monitor function 112 may monitor the audio content of the conversation in a number of ways. For example, one or more microphones associated with each physical meeting location and/or participant may be configured to capture each participant's speech. The captured audio can then be transmitted to a central location where it can be centrally stored for later playback. The audio can also be analyzed by the monitor function 112 and other functions. The monitor function 112 may be capable of performing speech-to-text conversion of the audio content, such that the monitor function 112 is able to interpret the audio content. In other embodiments, the monitor function 112 can use phonetic speech recognition methods to convert the audio content into a format that the monitor function 112 can analyze. In some embodiments, alternative audio analysis tools, such as Nuance™, may be configured to detect a small subset of words, each associated with the generation of a specific action item or action item type. The monitor function 112 can then analyze the audio content for one or more triggers, such as an audio trigger. For example, if phonetic speech recognition analysis of the audio content detects an utterance of an audio trigger, the monitor function 112 indicates that an audio trigger has been detected and invokes the generate function 114. In another example, an audio tone, such as a dual-tone multi-frequency (DTMF) tone, may be used as an audio trigger or part of an audio trigger to generate an action item. Other examples of speech recognition analysis may be found in U.S. patent application Ser. No. 12/341,246 ("Method and System for Detecting a Relevant Utterance in a Voice Session"), which is hereby incorporated by reference in its entirety for this purpose.

The generate function 114 may collect the audio trigger and a portion of the audio content before, after, or a time otherwise associated with the audio trigger. For example, an utterance of the audio trigger "draft" by a participant may invoke the generate function 114 to generate an action item relating to the audio trigger "draft" and a portion of the audio content following the "draft," such as "a memo on the licensing deal." The generate function 114 can tentatively assign the action item to the speaker of the audio trigger. Alternatively, the generate function 114 and/or monitor function 112 can also detect a responsible party for the action item based on the audio content before and/or after the audio trigger. For example, in response to detecting the audio trigger "draft" in the phrase "David will draft a memo on the licensing deal," the monitor function 112 and/or generate function 114 may also determine that David is the responsible party for the action item. In some embodiments, keyword-like phrasing can trigger dynamic capturing of action items during a meeting, along with extracting a relevant portion of the audio before, after, or a time otherwise associated with the keyword phrasing.

After the generate function 114 generates the action item, the notify function 116 can alert one or more persons associated with the conversation. For example, in one embodiment, the notify function 116 can alert the participant who triggered the generation of the action item and can give the participant an opportunity to confirm, modify, or cancel the content of the action item. Likewise, in another embodiment, the notify function 116 can alert a moderator or other authorized person of the action item in addition to or instead of the participant who triggered the generation of the action item. In another embodiment, the notify function 116 can also alert all the participants in the conversation, as desired. In some embodiments, the audio component of the conversation containing the action item is sent to the participant or other authorized person as a notification. In some embodiments, the notification need not occur in real time, and may be transmitted to the participant(s) and/or other authorized persons at a later time, such as at the conclusion of the conversation.

In some embodiments, simply speaking something like "capture action, assign to Bob Smith, action due Monday, end action" will trigger the creation of an email, meeting minutes entry, or entry in an action tracking application that includes the audio file segment of the action statement data extracted from the audio, such as date due, person assigned to, context of where action came from, etc. The assigned person can be checked against the list of participants in the conversation if desired to ensure actions are issued in the context of the conversation. In some embodiments, actions can be maintained in a local or central database with updatable status. In other embodiments, a system can monitor the database and send reminders including verbal reminders that play the captured audio file or make it readily available in the message to remind the person tasked to revisit the action item. Throughout the process of handling the action, the person tasked can use one of several user interfaces to update the action status. Exemplary interfaces include replying to the action email or any email reminders with a new status or making a selection or verbal statement when a verbal reminder is presented. Once an action is completed, a completed status update can be sent to all the original conversation participants. Individual, group, and other relative productivity metrics related to action completion can be computed and disseminated as desired including in the completed status communications.

Figure 2:
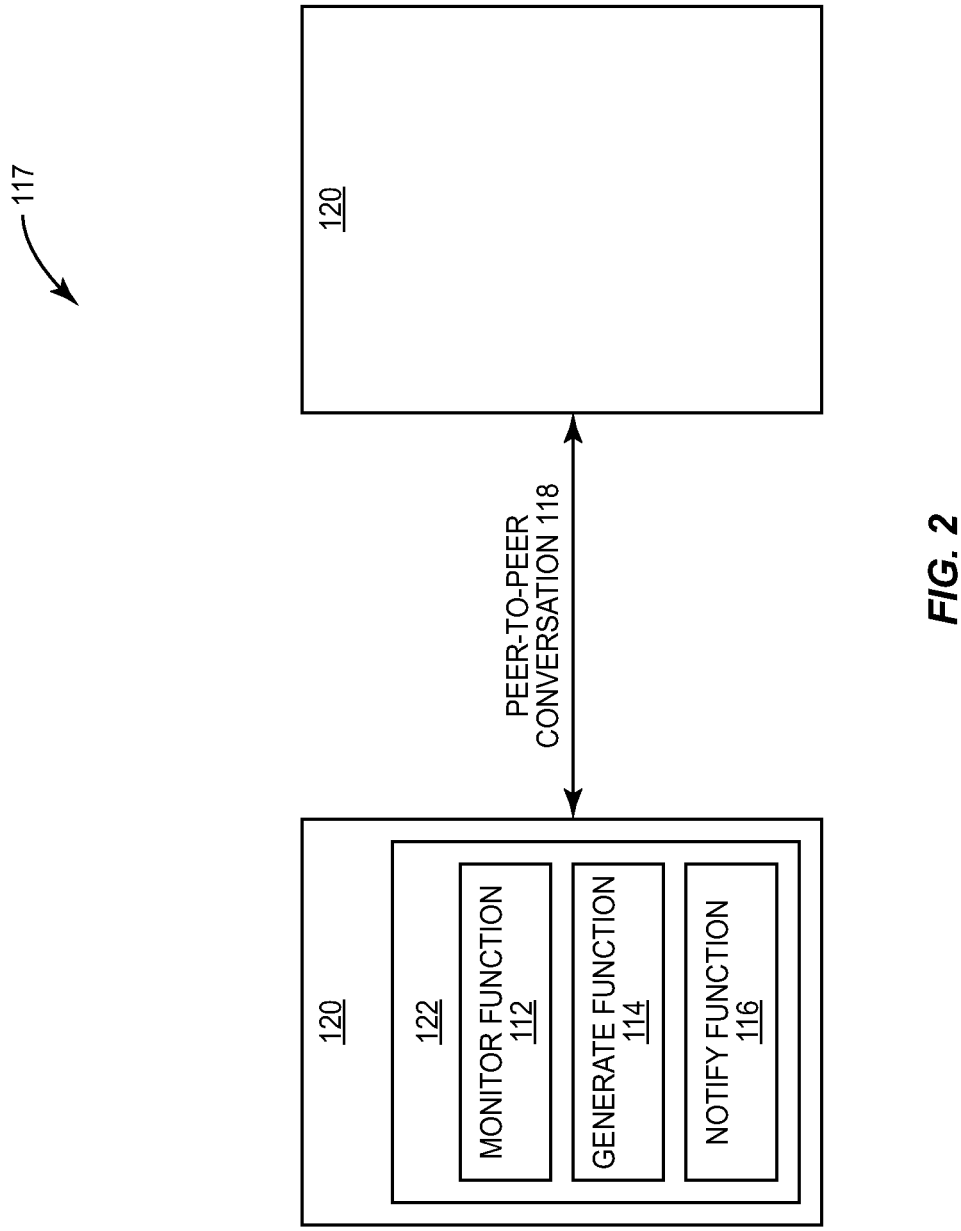
FIG. 2 is a block diagram of an exemplary peer-to-peer system for generating an action item according to one embodiment.

FIG. 2 is a block diagram of an exemplary peer-to-peer system 117 for generating an action item according to one embodiment. Instead of controlling and managing a plurality of participants via the conference bridge 102 as in FIG. 1, the system 117 of this embodiment includes as few as two participants communicating over a conventional peer-to-peer conversation 118 via respective user devices 120, such as telephones, PCs and/or other communication devices. In this embodiment, at least one of the user devices 120 includes a controller 122 having a monitor function 112, a generate function 114, and a notify function 116. The controller 122 is similar to the conference bridge controller 110 of FIG. 1 and has similar functionality with respect to the peer-to-peer conversation 118 and its associated participants.

Figure 3:
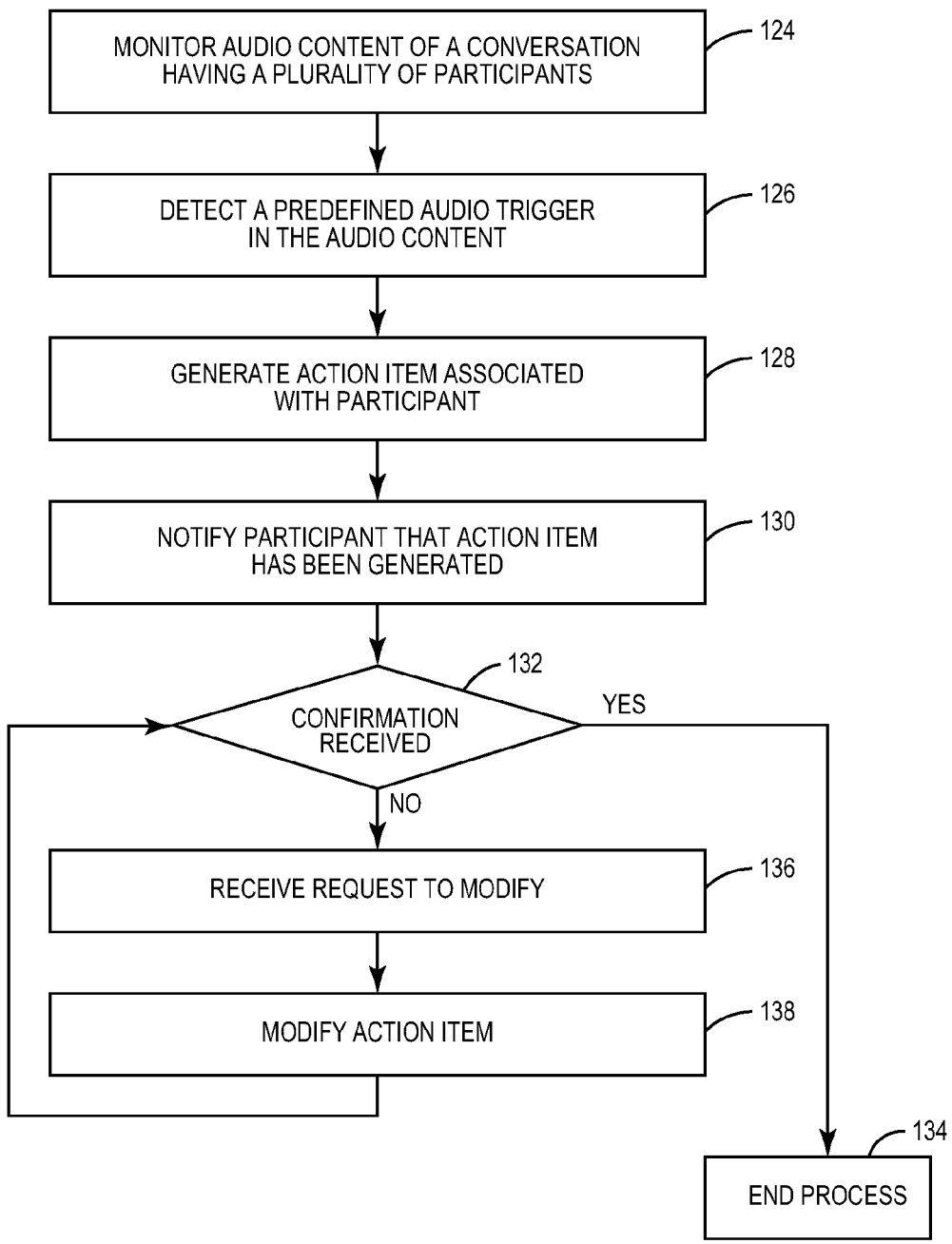
FIG. 3 is a flowchart of an exemplary method for generating an action item according to one embodiment.

FIG. 3 is a flowchart of an exemplary method of generating an action item according to one embodiment and that can be employed in the conference system 100 of FIG. 1 and the peer-to-peer system 117 of FIG. 2. In this embodiment, the method is performed by the conference bridge controller 110 of FIG. 1. It should be recognized that the disclosed method of this and other embodiments can be performed using additional or different hardware and/or software as well. During normal operation, the conference bridge 102 receives and reroutes the audio content of the conversation to the other participants. In this embodiment, the conference bridge controller 110 also monitors the audio content of the conversation (block 124), for example, via the monitor function 112. The monitor function 112 of the conference bridge controller 110 is also configured to detect one or more predefined audio triggers in the audio content of the conversation (block 126).

When an audio trigger is detected by the monitor function 112, the generate function 114 then uses the audio trigger and a portion of the audio content associated with the audio trigger to generate an action item associated with the participant (block 128). The action item can include a text entry of the relevant portion(s) of the audio content, a copy of the audio portion itself, a pointer to the audio portion, relevant participants and/or related tasks, or a combination thereof.

When the action item is generated by the generate function 114, the conference bridge controller 110 then notifies the participant that the action item has been generated (block 130). The participant is then able to confirm or otherwise establish "ownership" of the action item. The conference bridge controller 110 determines whether a confirmation has been received (block 132). If a confirmation has been received, the method ends (block 134). If a confirmation has not been received, the conference bridge controller 110 is configured to receive a request to modify the action item, for example from the participant, or from a moderator, supervisor or other authorized person (block 136). In response to the request to modify the action item, the conference bridge controller 110 modifies the action item (block 138), and again determines whether a confirmation has been received (block 132) from the participant or other authorized person.

With continuing reference to FIG. 3, generating the action item (block 128) may include storing the action item in permanent or temporary memory. Likewise, ending the method (block 134) in response to receiving a confirmation may also include storing the action item in permanent or temporary memory, and may also include transferring or copying the action item from one memory or section of memory into another memory or section of memory. In some embodiments, storing the action item can include storing a portion of the audio content of the conversation associated with the audio trigger and/or following the audio trigger. In another embodiment, the action item can include a pointer, such as a hyperlink or other software link, to a portion of the audio content of the conversation associated with the audio trigger and/or following the audio trigger.

With continuing reference to FIG. 3, the method may be performed by a conference bridge, such as the conference bridge controller 110 associated with the conference bridge 102 of FIG. 1. In another embodiment, the method may be performed by a user device, such as the telephone 104 or computing device 106 of FIG. 1, or the user devices 120 of FIG. 2. In yet another embodiment, the method may be performed by remote hardware, such as a server (not shown) in communication with the conference bridge 102 of FIG. 1 or the peer-to-peer conversation 118 of FIG. 2.

With continuing reference to FIG. 3, notification of the participant (block 130), moderator or other authorized person of the generation of the action item (block 128) may comprise an audio notification in some embodiments. In some embodiments, the audio notification can include an alert sound, or can include a recorded or generated speech prompt informing one or more participants or other authorized persons that the action item has been generated. The audio notification can be provided to all participants on the conversation, for example, to inform all participants that an action item is being generated, or to a subset of the participants, for example, to avoid interrupting or disturbing participants in the conversation who are not involved with the action item being generated. For example, in one embodiment, if only the participant who uttered the audio trigger and the moderator are authorized to modify or confirm the generation of the action item, only those authorized persons may hear the audio notification. In another embodiment, one or more third parties can be notified, such as a third party who is being made responsible for the generated action item.

With continuing reference to FIG. 3, in one embodiment, the audio notification overrides the conference audio to ensure the participant or other authorized person is aware of the notification, for example. In another embodiment, the audio notification can be mixed or layered into the conference audio, in order to notify the participant or other authorized person without interrupting the participant's ability to hear the audio content of the conversation. In one embodiment, this mixing may be performed in a three-dimensional (3D) spatial format to help differentiate it from the ongoing conference audio.

With continuing reference to FIG. 3, in another embodiment, the notification can include a graphic notification, such as a text notification. The graphic notification can be displayed via a user device, such as the computing device 106 of FIG. 1 or the user devices 120 of FIG. 2. The graphic notification may be displayed via a modal alert, such as a pop-up window, or may be displayed in an easily viewed but unobtrusive manner, such as in a menu bar or dock of the user device.

Figure 4:
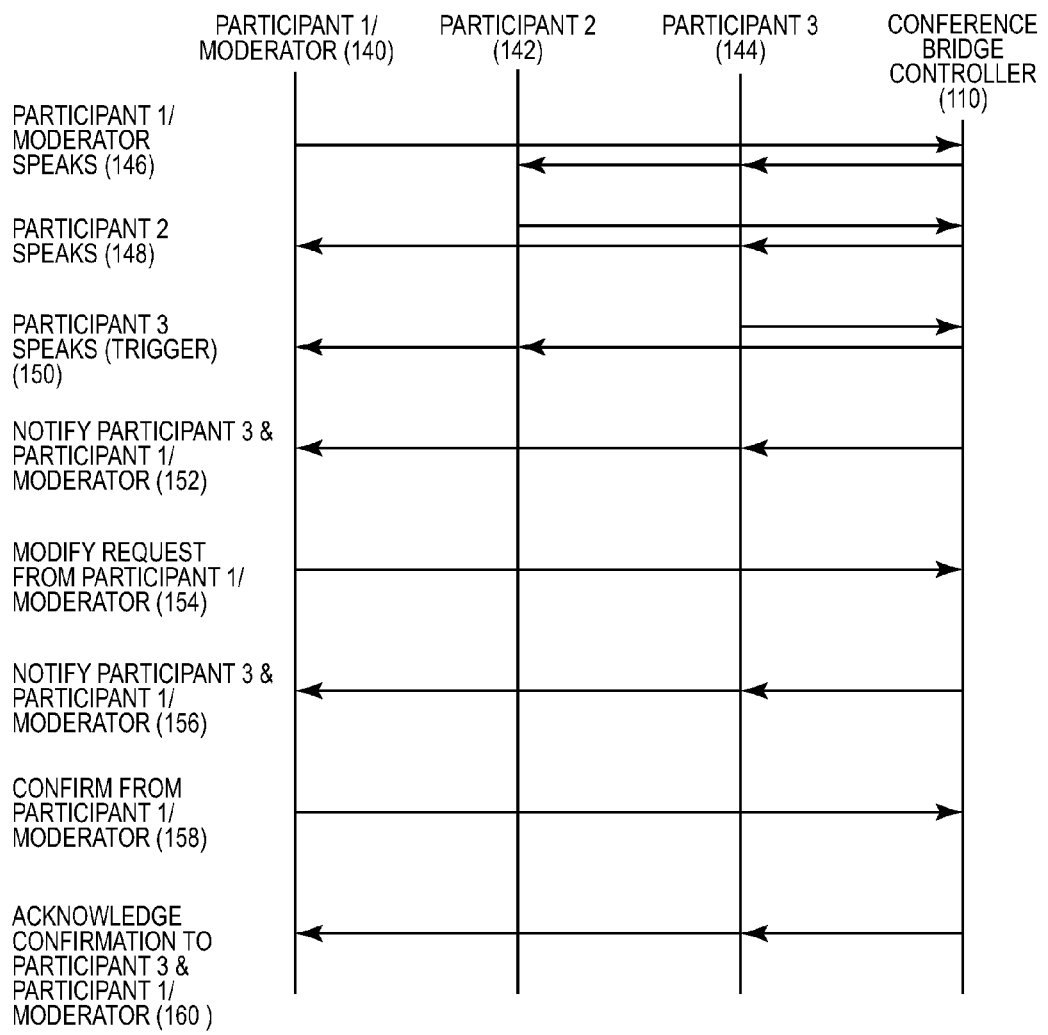
FIG. 4 illustrates an exemplary workflow for generating an action item according to one embodiment.

FIG. 4 illustrates an exemplary workflow for generating an action item according to one embodiment. In this embodiment, a conversation has three participants: Participant 1/Moderator 140, Participant 2 142, and Participant 3 144. Participant 1/Moderator 140, Participant 2 142, and Participant 3 144 are each regular participants in the conversation, and each is able to cause the system to generate an action item based on an audio trigger, such as an audio command or other trigger word. Participant 1/Moderator 140 also has authorization to confirm and modify action items that are generated during the conversation. In this embodiment, Participants 2 and 3 142, 144 do not have this authorization, but in other embodiments, some or all of the other participants could have such authorization to confirm and/or modify generated action items.

In the embodiment in FIG. 4, Participant 1/Moderator 140 speaks (block 146), at which point the audio is received by the conference bridge controller 110 and relayed to the other participants. In block 148, Participant 2 142 speaks next, and the associated audio is likewise relayed to the other participants by the conference bridge controller 110. In block 150, Participant 3 144 speaks and utters an audio trigger, which is relayed to the other participants by the conference bridge controller 110.

The conference bridge controller 110 also, in response to the audio trigger, generates an action item and notifies both Participant 1/Moderator 140 and Participant 3 144 (block 152). In another embodiment, only the Participant 1/Moderator 140 is notified, since the Participant 1/Moderator 140 is the only party with the authority to confirm and/or modify the action item. In another embodiment, all participants 140, 142, 144 may be notified of the generation of the action item.

In block 154, Participant 1/Moderator 140 makes a modification request based on the notification of the action item from block 152. The conference bridge controller 110 makes the requested modification, such as an edit to the content of the action item, and again notifies Participant 1/Moderator 140 and Participant 3 144 (block 156). In block 158, Participant 1/Moderator 140 confirms the action item, and the conference bridge controller 110 acknowledges the confirmation of the action item to Participant 1/Moderator 140 and Participant 3 144 in block 160.

Figure 5:
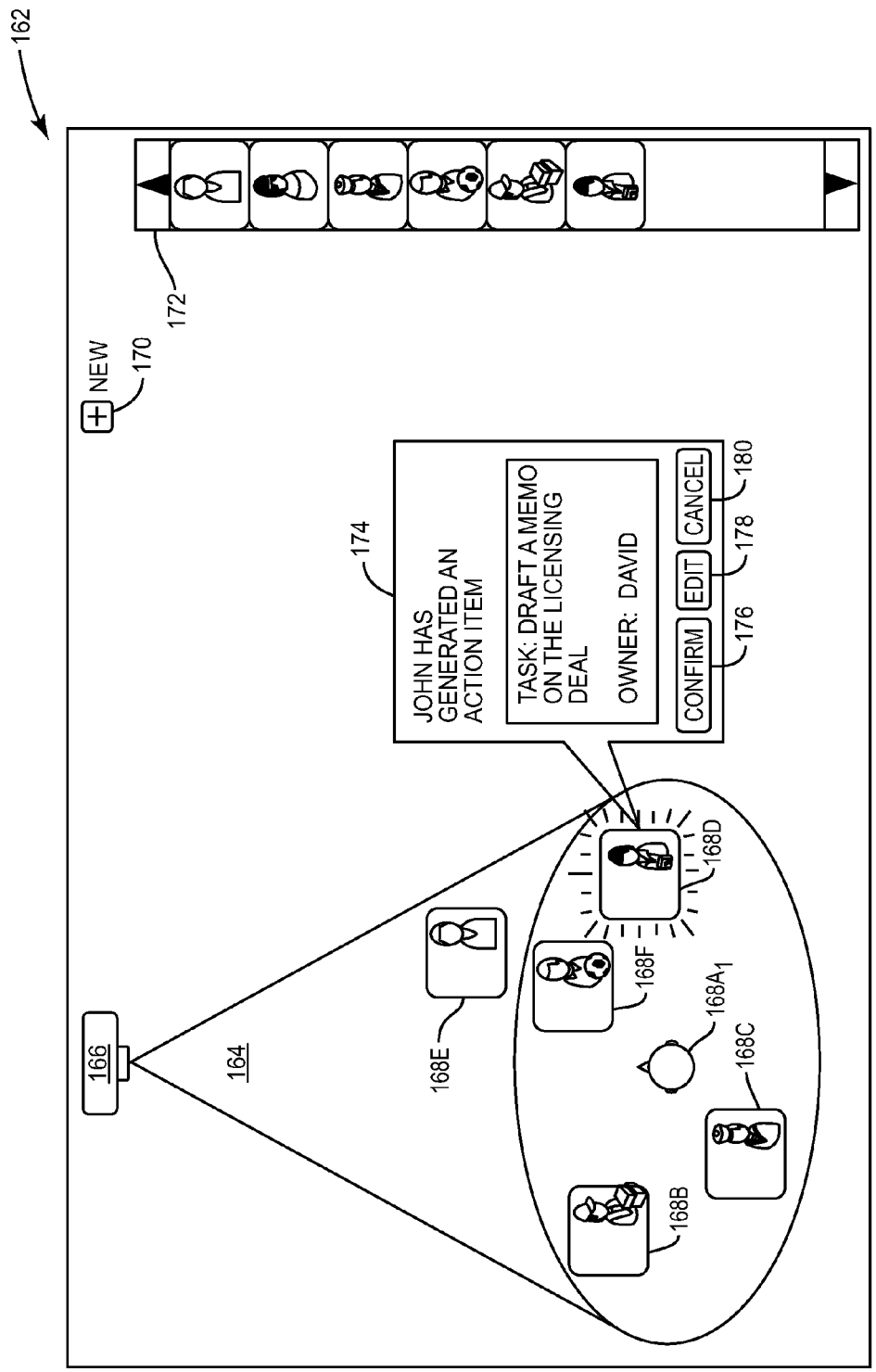
FIG. 5 illustrates an exemplary software user interface for generating an action item according to one embodiment.

FIG. 5 illustrates an exemplary software user interface 162 for generating an action item according to one embodiment and that can be employed in the conference system 100 of FIG. 1 and the peer-to-peer system 117 of FIG. 2. The user interface 162 has a first defined area 164 corresponding to an interaction, such as a conference. The first defined area 164 is preferably visually distinguishable from other portions of the user interface 162. In some embodiments, the user interface 162 may have additional defined areas, based on, for example, a number of desired interactions. In the embodiment illustrated in FIG. 5, the first defined area 164 comprises an image of a light beam emanating from a projector 166, but it will be apparent that any visually distinguishing characteristic may be used to depict defined areas in accordance with the embodiments disclosed herein. Other examples of user interfaces may be found in U.S. patent application Ser. No. 12/948,140 ("Method and System for Controlling Audio Signals in Multiple Concurrent Conference Calls"), which is hereby incorporated by reference in its entirety for this purpose In this embodiment, the first defined area 164 is associated with a conference or other conversation. A first plurality of participant identifiers $168A_1$-168F (generally, participant identifier 168 or participant identifiers 168) is displayed in association with the first defined area 164. In one embodiment, the conference may have been initiated by, for example, the controlling participant $168A_1$ by clicking on a "New Conference" button 170, which may cause the first defined area 164 to be depicted. The controlling participant $168A_1$ may then "drag and drop" the desired participant identifiers 168 from a contacts list 172 into the first defined area 164. As each participant identifier 168 is dragged from the contacts list 172 and dropped into the first defined area 164, the communication device (such as the computing device 106 of FIG. 1) may send a control signal to the conference bridge controller 110 (not shown) with the contact information, such as a telephone number or the like of the participant corresponding to the participant identifier 168, requesting that the conference bridge controller 110 initiate a communication session with the telephone 104 or computing device 106 of FIG. 1, or other communication devices identified by the contact information. In a similar manner, the controlling participant $168A_1$ may initiate a second conference with another set of participants. Alternately, the first conference may be a conference that was initiated by one of the participants and the user interface 162 at the initiation of the conference, or may depict the first defined area 164 and request that the controlling participant $168A_1$ join the first conference.

While the participant identifiers 168 are depicted as iconic images for purposes of illustration, the participant identifiers 168 may be still images or photographs of the corresponding participants, or may display actual video of the participants by virtue of video data that is captured by the corresponding communication devices associated with the participants and provided to the communication device of the controlling participant $168A_1$.

In response to the detection of the audio trigger, the participant identifier 168 associated with the audio trigger may become highlighted by the user interface 162. Likewise, after the action item has been generated, an interface element, such as a dialog box 174, may be displayed in association with the participant identifier 168 along with a number of buttons, such as a "Confirm" button 176, an "Edit" button 178, and a "Cancel" button 180. The buttons 176, 178, 180 may be selected via an input device, such as a mouse or keyboard, or, if the user interface 162 is displayed via a touch display, via touch.

Upon selecting the "Confirm" button 176, the step of confirming the action item is performed, as described above with respect to FIG. 3. Likewise, upon selecting the "Edit" button 178, the step of modifying the action item is initiated, as described above with respect to FIG. 3. Upon selecting the "Cancel" button 180, for example if the action item was created in error, the action item can be removed and discarded. Additional user interface elements may be added, removed or modified, as desired.

Figure 6:
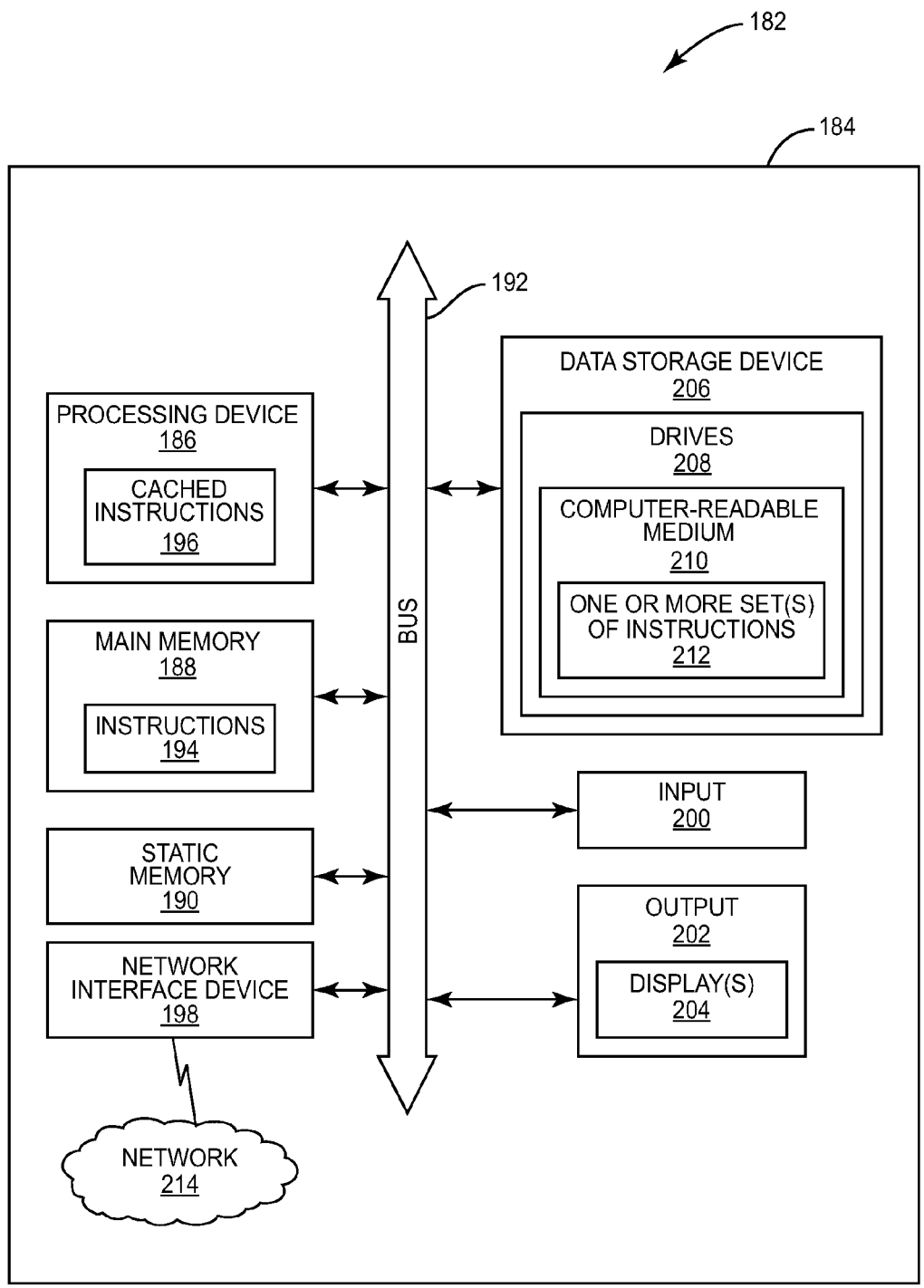
FIG. 6 is a block diagram of an exemplary processor-based system that can include the system of FIG. 1.

FIG. 6 is a schematic diagram of an exemplary processor-based system that can include a controller 182, such as the conference bridge controller 110 of FIG. 1 or the controller 122 of FIG. 2. In this embodiment, the controller 182 in the exemplary form of an exemplary computer system 184 is adapted to execute instructions from an exemplary computer-readable medium to perform the functions described herein. In this regard, the controller 182 may comprise the computer system 184 within which a set of instructions for causing the controller 182 to perform any one or more of the methodologies discussed herein may be executed. The controller 182 may be connected (as a non-limiting example, networked) to other machines in a local area network (LAN), an intranet, an extranet, or the Internet. The controller 182 may operate in a client-server network environment, or as a peer machine in a peer-to-peer (or distributed) network environment. While only a single controller 182 is illustrated, the terms "controller" and "server" shall also be taken to include any collection of machines that individually or jointly execute a set (or multiple sets) of instructions to perform any one or more of the methodologies discussed herein. The controller 182 may be a server, a personal computer, a desktop computer, a laptop computer, a personal digital assistant (PDA), a computing pad, a mobile device, or any other device and may represent, as non-limiting examples, a server or a user's computer.

The exemplary computer system 184 includes a processing device or processor 186, a main memory 188 (as non-limiting examples, read-only memory (ROM), flash memory, dynamic random access memory (DRAM) such as synchronous DRAM (SDRAM), etc.), and a static memory 190 (as non-limiting examples, flash memory, static random access memory (SRAM), etc.), which may communicate with each other via a bus 192. Alternatively, the processing device 186 may be connected to the main memory 188 and/or the static memory 190 directly or via some other connectivity means.

The processing device 186 represents one or more processing devices such as a microprocessor, central processing unit, or the like. More particularly, the processing device 186 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 186 is configured to execute processing logic in instructions 194 and/or cached instructions 196 for performing the operations and steps discussed herein.

The computer system 184 may further include a communications interface in the form of a network interface device 198. It also may or may not include an input 200 to receive input and selections to be communicated to the computer system 184 when executing instructions. It also may or may not include an output 202, including but not limited to display(s) 204, a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 184 may or may not include a data storage device 206 that includes using drive(s) 208 to store functions herein described in a computer-readable medium 210 on which is stored one or more sets of instructions 212 (e.g., software) embodying any one or more of the methodologies or functions described herein. The functions can include the methods and/or other functions of the controller 182 or associated devices. The instructions 212 may also reside, completely or at least partially, within the main memory 188 and/or within the processing device 186 during execution thereof by the computer system 184, the main memory 188, and the processing device 186 also constituting machine-accessible storage media. The instructions 194, 196, and/or 212 may further be transmitted or received over a network 214 via the network interface device 198. The network 214 can be an intra-network or an inter-network.

While the computer-readable medium 210 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 212. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, optical and magnetic media, and carrier wave signals.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method comprising:
   monitoring, by the processor, of audio content of a conversation having a plurality of participants;
   detecting, by the processor, a predefined audio trigger in the audio content;
   generating, by the processor, at least one action item associated with at least one of the plurality of participants in response to detecting the predefined audio trigger, wherein the at least one action item is based on the predefined audio trigger and on a portion of the audio content associated with the predefined audio trigger; and notifying, by the processor, the at least one of the plurality of participants that the at least one action item has been generated.

2. The method of claim 1, further comprising receiving a confirmation from the at least one of the plurality of participants that the at least one of the plurality of participants has acknowledged the at least one action item.

3. The method of claim 2, further comprising storing the at least one action item based on receiving the confirmation.

4. The method of claim 3, wherein storing the at least one action item comprises storing the at least one action item in a tangible storage medium with other action items generated during the conversation.

5. The method of claim 2, further comprising, prior to receiving a confirmation, receiving a request to modify the at least one action item and modifying the at least one action item in response to the request.

6. The method of claim 1, wherein monitoring the audio content of the conversation is performed via a conference bridge.

7. The method of claim 1, wherein the conversation is a peer-to-peer conversation.

8. The method of claim 1, wherein monitoring the audio content of the conversation is performed via a server.

9. The method of claim 1, wherein detecting the predefined audio trigger in the audio content comprises performing real-time phonetic detection on the audio content.

10. The method of claim 9, wherein generating the at least one action item comprises performing the real-time phonetic detection on the portion of the audio content occurring after the predefined audio trigger.

11. The method of claim 1, wherein the predefined audio trigger is a voice command.

12. The method of claim 1, wherein notifying the at least one of the plurality of participants that the at least one action item has been generated comprises notifying the at least one of the plurality of participants associated with the at least one action item.

13. The method of claim 1, wherein notifying the at least one of the plurality of participants that the at least one action item has been generated comprises transmitting an audio notification to the at least one of the plurality of participants.

14. The method of claim 13, wherein transmitting the audio notification comprises mixing the audio notification into the audio content.

15. The method of claim 1, wherein notifying the at least one of the plurality of participants that the at least one action item has been generated comprises transmitting a text notification to at least one device associated with the at least one of the plurality of participants.

16. The method of claim 1, wherein the at least one action item includes a pointer associated with the portion of the audio content associated with the predefined audio trigger.

17. The method of claim 1, wherein the at least one action item includes the portion of the audio content associated with the predefined audio trigger.

18. A conference bridge controller that:
monitor audio content of a conversation having a plurality of participants;
detect a predefined audio trigger in the audio content;
generate at least one action item associated with at least one of the plurality of participants in response to detecting the predefined audio trigger, wherein the at least one action item is based on the predefined audio trigger and on a portion of the audio content associated with the predefined audio trigger; and
notifies the at least one of the plurality of participants that the at least one action item has been generated.

19. The conference bridge controller of claim 18, wherein the conference bridge controller is further configured to, prior to receiving a confirmation, receive a request to modify the at least one action item and modify the at least one action item in response to the request.

20. A non-transitory computer-readable medium containing instructions for directing a processor to perform a method, comprising:
monitoring audio content of a conversation having a plurality of participants;
detecting a predefined audio trigger in the audio content;
generating at least one action item associated with at least one of the plurality of participants in response to detecting the predefined audio trigger, wherein the at least one action item is based on the predefined audio trigger and on a portion of the audio content associated with the predefined audio trigger; and
notifying the at least one of the plurality of participants that the at least one action item has been generated.

21. The non-transitory computer-readable medium of claim 20, wherein the method further comprises, prior to receiving a confirmation, receiving a request to modify the at least one action item and modifying the at least one action item in response to the request.

* * * * *